(12) United States Patent
Dewsnap

(10) Patent No.: US 9,657,745 B2
(45) Date of Patent: May 23, 2017

(54) ADJUSTMENT MECHANISM FOR PUMP SEAL

(71) Applicant: Linatex Limited, Lancashire (GB)

(72) Inventor: Gregory Craig Dewsnap, Surrey (GB)

(73) Assignee: Linatex Limited (GB)

( * ) Notice: Subject to any disclaimer, the term of this patent is extended or adjusted under 35 U.S.C. 154(b) by 0 days.

(21) Appl. No.: 15/084,774

(22) Filed: Mar. 30, 2016

(65) Prior Publication Data

US 2016/0273544 A1 Sep. 22, 2016

Related U.S. Application Data

(63) Continuation of application No. 13/820,144, filed as application No. PCT/AU2010/001379 on Oct. 18, 2010, now Pat. No. 9,322,412.

(30) Foreign Application Priority Data

Aug. 31, 2010 (AU) ................................ 2010903916

(51) Int. Cl.
*F16J 15/34* (2006.01)
*F04D 29/12* (2006.01)
*F04D 29/10* (2006.01)
*F04D 29/62* (2006.01)
*F04D 29/28* (2006.01)

(52) U.S. Cl.
CPC ......... *F04D 29/126* (2013.01); *F04D 29/106* (2013.01); *F04D 29/12* (2013.01); *F04D 29/28* (2013.01); *F04D 29/622* (2013.01); *F04D 29/628* (2013.01); *F16J 15/346* (2013.01); *F16J 15/3452* (2013.01)

(58) Field of Classification Search
CPC ....... F16J 15/34; F16J 15/3436; F16J 15/3464
See application file for complete search history.

(56) References Cited

U.S. PATENT DOCUMENTS 3,420,535 A 1/1969 Hershey
3,765,689 A 10/1973 Adams
(Continued)

FOREIGN PATENT DOCUMENTS

JP 2185698 A 7/1990

*Primary Examiner* — Gilbert Lee
(74) *Attorney, Agent, or Firm* — Morriss O'Bryant Compagni

(57) ABSTRACT

An adjustment mechanism (85) for a seal assembly (80) for a pump drive shaft (52) of a pump, the pump shaft (52) mounted for rotation about a rotation axis. The seal assembly (80) comprises a rotating seal (81) mounted for rotation with the drive shaft (52) about the rotation axis and a static seal (84) adjacent the rotating seal (81) and axially moveable relative thereto. The adjustment mechanism (85) comprises an adjustment member (87) which is axially moveable so as to cause axial movement of the static seal (84) relative to the rotating seal (81). The mechanism further includes an actuator (88) and a transmission (93) for transmitting a motive force from the actuator to the adjustment member as a result of activation of the actuator. The transmission (93) is operatively connected to the adjustment member (87) at two spaced apart couplings (98) whereby activation of the actuator causes simultaneous transmission of the motive force to the two spaced apart couplings. The actuator (88) is disposed externally of all pump parts.

25 Claims, 7 Drawing Sheets

(56) References Cited

U.S. PATENT DOCUMENTS

| | | | |
|---|---|---|---|
| 3,972,536 A * | 8/1976 | Warner | F16J 15/3464 |
| | | | 277/372 |
| 4,256,313 A * | 3/1981 | Arnold | F16J 15/3464 |
| | | | 277/370 |
| 4,575,306 A | 3/1986 | Monnot | |
| 4,832,351 A | 5/1989 | Ciotola | |
| 4,993,720 A | 2/1991 | Ciotola | |
| 4,997,191 A | 3/1991 | Warner | |
| 2006/0280599 A1 | 12/2006 | Manninen | |
| 2009/0116960 A1 | 5/2009 | Lehtonen et al. | |

\* cited by examiner

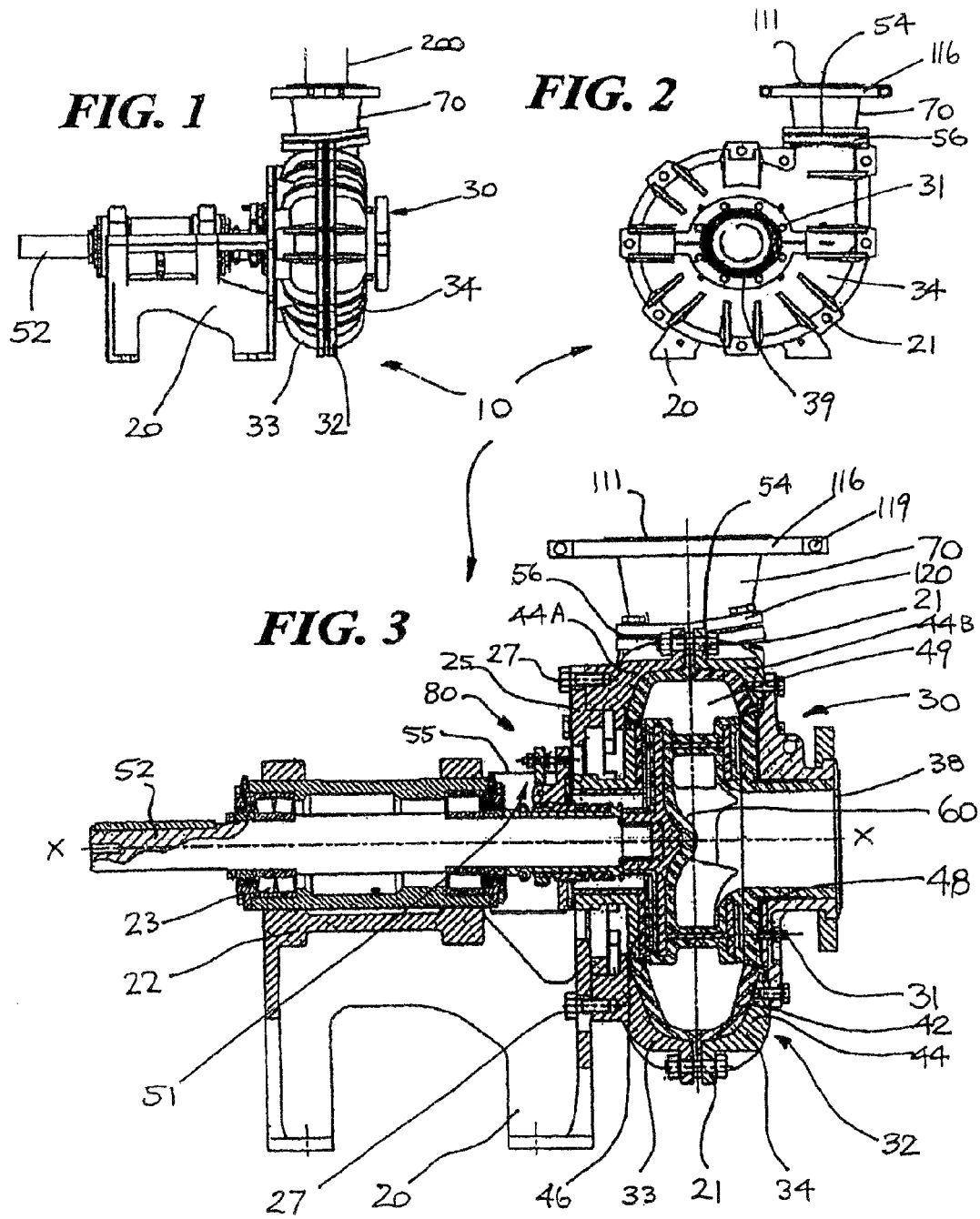

ADJUSTMENT MECHANISM FOR PUMP SEAL

TECHNICAL FIELD

The disclosure relates generally to pumps and more particularly to seal assemblies therefore and to components for pump seal assemblies.

BACKGROUND ART

Pumps of the centrifugal type generally comprise a pump housing the interior of which forms a pump chamber. An impeller is positioned in the pump chamber and is connected to a drive shaft and drive motor that impart rotation to the impeller. The pump housing is formed with an inlet for receiving pumped material into the pump chamber, and a discharge outlet through which pumped material exits the pump chamber.

Seal assemblies are required to provide fluid barriers between various pump parts. One example of such seal assemblies is of the type used to seal the entry region of the drive shaft into the pump chamber. In one form of known seal assembly of this type the assembly comprises a rotating seal member which is mounted for rotation with the drive shaft and a static seal member which is adapted to bear against the rotating seal in order to provide an effective seal between the pump chamber and the drive shaft. Seal assemblies of this type are often referred to as gland seals. In this type of seal the sealing faces between the rotating and static seal members are lubricated and cooled by a small leakage of fluid between the seal members.

In order for the seal assembly to operate properly careful alignment and adjustment of the position of the seal members must be done for correct initial set up and maintenance and further adjustment when the pump is operating (dynamic adjustment). Incorrect location of the two seal members can result in seal failure as a result of lack of lubrication of the sealing faces.

SUMMARY OF THE DISCLOSURE

In one aspect there is provided an adjustment mechanism for a seal assembly for a pump drive shaft of a pump, the pump shaft mounted for rotation about a rotation axis, the seal assembly including a rotatable seal mounted for rotation with the drive shaft about the rotation axis and a static seal adjacent the rotatable seal and axially moveable relative thereto, the adjustment mechanism comprising an adjustment member which is axially moveable so as to cause axial movement of the static seal relative to the rotatable seal, an actuator and a transmission for transmitting a motive force from the actuator to the adjustment member as a result of activation of the actuator, the transmission being operatively connected to the adjustment member at one or more couplings(s) whereby activation of the actuator causes simultaneous transmission of the motive force to the or each couplings.

In certain embodiments, the one or more coupling(s) can comprise at least two spaced apart couplings.

In certain embodiments, the adjustment member can include an adjustment sleeve, which is mounted substantially coaxially with respect to the drive shaft in an assembled position and axially movable relative thereto, the static seal being operatively mounted to one end of the adjustment sleeve.

In certain embodiments, the adjustment mechanism can further include a mounting member secured to the other end of the adjustment sleeve, the spaced apart couplings being on the mounting member. In certain embodiments the mounting member can comprise a ring secured to the other end of the adjustment sleeve. In certain embodiments the spaced apart couplings can be pivot mountings disposed on opposite sides of the adjustment sleeve.

In certain embodiments the transmission can comprise a fork shaped member having two spaced apart legs extending away from one end of the fork shaped member the free end of each of the legs being pivotally connected to a respective one of the two spaced apart couplings the member being mounted for pivotal movement in a region between the end of the fork shaped member and the free ends of the spaced apart legs, the one end of the fork shaped member being associated with the actuator.

In certain embodiments the actuator when fitted can be spaced from the drive shaft and external of all pump parts.

In a second aspect, there is provided an adjustment mechanism for a seal assembly for a pump drive shaft of a pump, the pump shaft mounted for rotation about a rotation axis, the seal assembly including a rotatable seal mounted for rotation with the drive shaft about the rotation axis and a static seal adjacent the rotatable seal and axially moveable relative thereto, the adjustment mechanism comprising an adjustment member which is axially moveable so as to cause axial movement of the static seal relative to the rotatable seal, an actuator and a transmission for transmitting a motive force from the actuator to the adjustment member as a result of activation of the actuator, the transmission being operatively connected to the adjustment member whereby activation of the actuator causes simultaneous transmission of the motive force to the adjustment member, the actuator being spaced from the drive shaft and external of all pump parts when fitted.

In a third aspect, there is provided a seal assembly for a pump drive shaft of a pump, the seal assembly including a housing having a seal chamber therein arranged so that when fitted the drive shaft extends through the pump chamber and an adjustment mechanism as described above the rotatable and static seal being disposed within said seal chamber and the adjustment member being at least partially received within the seal chamber.

In a fourth aspect, there is provided a method of adjustment for a seal assembly as described above, the method including the step of activating the actuator to cause relative movement between the rotatable and static seal members.

In certain embodiments, the method of the third aspect may include a first step being a coarse adjustment step and a second step being a fine adjustment step effected by the actuator.

BRIEF DESCRIPTION OF THE DRAWINGS

Notwithstanding any other forms which may fall within the scope of the methods and apparatus as set forth in the Summary, specific embodiments will now be described, by way of example, and with reference to the accompanying drawings in which:

FIG. 1 is a schematic side elevation of an embodiment of a pump apparatus;

FIG. 2 is a schematic end elevation of the pump apparatus shown in FIG. 1;

FIG. 3 is a sectional side view of the pump apparatus shown in FIG. 1;

DETAILED DESCRIPTION OF SPECIFIC EMBODIMENTS

Figure 4:
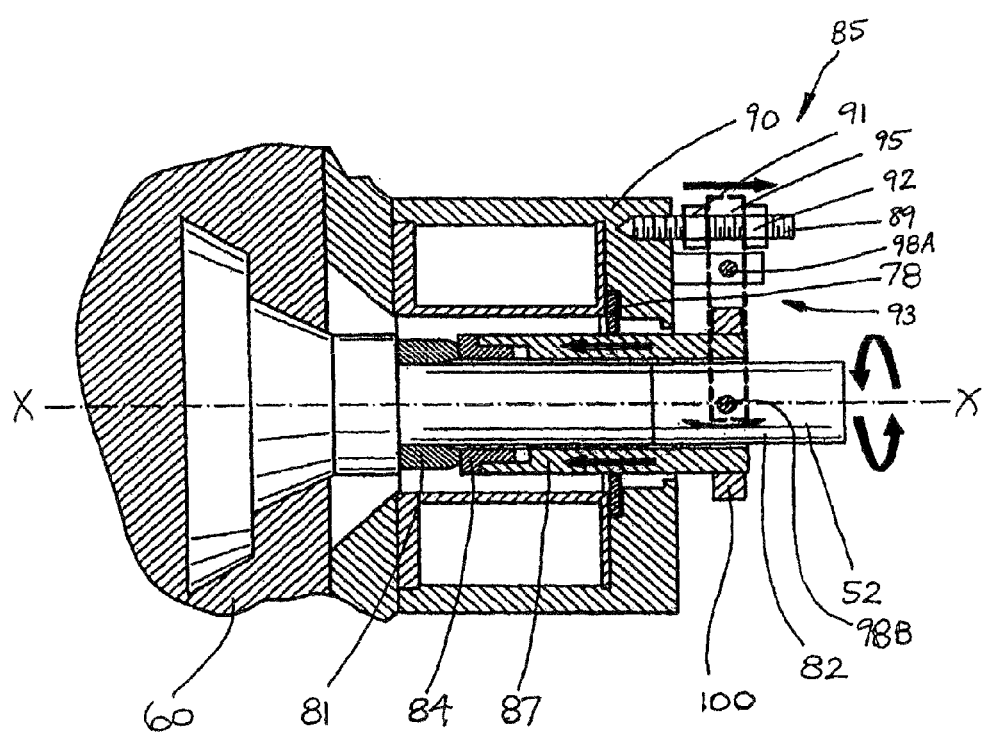
FIG. 4 illustrates a schematic sectional view of an adjustment mechanism of the pump apparatus shown in FIGS. 1 to 3.

Referring to the drawings, in particular to FIGS. 1 to 3, there is illustrated a pump assembly 10 having a pump housing support 20 (often referred to in the pump industry as a pedestal or frame) to which is attached a pump housing 30. As illustrated in FIG. 3 the pump housing 30 generally comprises an outer casing 32 which comprises two side casing parts 33, 34 (sometimes also known as the frame plate and the cover plate, respectively) which are joined together about a periphery of the two side casings parts 33, 34 by bolts 21. The side casing part (or frame plate) 33 is mounted to a mounting ring 25 which forms part of the housing support 20 by means of bolts 27. The housing support 20 includes a shaft bearing mounting section 22 for receiving a shaft bearing cartridge 23 thereon. A drive shaft 52 is supported by the bearing cartridge 23 and extends into pump chamber 49 through a seal assembly 80 and a side opening in the side casing part (or frame plate) 33. An end cover plate in the form of a generally circular disc 39 is secured to the centre of the side casing part (or cover plate) 34 by bolts 31.

The pump housing 30 further comprises a pump housing inner liner 42 arranged within the outer casing 32 and which includes a main liner (or volute) 44 and two side liners 46, 48. The side liner (or back liner) 46 is located nearer the rear end of the pump housing 30 (that is, nearest to the pedestal or base 20, and also adjacent to the frame plate 33), and the other side liner (or front liner, also sometimes known as the throat bush) 48 is located nearer to the front end of the pump housing 30 and adjacent to the cover plate 34 and the circular disc 39.

In the embodiment shown, the main liner (or volute) 44 is comprised of two separate sections 44A, 44B (made of such material as rubber or elastomer) which are assembled within each of the side casing parts 33, 34 respectively and brought together when the pump housing 30 is assembled to form a single main liner 44, although in some embodiments the main liner (or volute) 44 may be made in one-piece and which may, for instance, be made of metal or ceramic material.

When the pump is assembled, side openings in the volute 44 are arranged to receive the two side liners 46, 48 to form a continuously-lined pump chamber 49 which is disposed within the pump outer casing 32. During use, fluid enters the pump chamber 49 through an inlet port 38 and is discharged through an outlet port 54 in the discharge outlet 56. A seal assembly 80 is disposed adjacent the side liner (or back liner) 46 and is arranged with various components to prevent leakage of fluid from the pump chamber 49 during use. Between the seal assembly 80 and the bearing cartridge 23 there is an access zone 51 which is at least partially surrounded by a guard or cover 55 in the form of a screen or mesh to prevent injury to a body part of a worker who may come into contact with any moving parts of machinery located at the back of the pump housing 30.

An impeller 60 is positioned in the pump chamber 49 within the volute 44 and is mounted to the drive shaft 52, which has a rotation axis X-X. A drive (not shown) is operatively connected to the drive shaft 52, in the region of the pedestal or base 20, and remote from the pump housing 30. The rotation of the impeller 60 causes the fluid (or solid-liquid mixture) that is being pumped to pass from a pipe which is connected to the inlet port 38, through the pump chamber 49 which is defined by the volute 44 and the side liners 46, 48, and then out of the pump chamber 49 via the discharge outlet port 54. The discharge outlet port 54 is arranged in the discharge outlet 56 portion of the pump housing 30. The discharge outlet 56 is operatively connected to adjacent pipework 200 via an adaptor 70 which will be described in detail hereinafter.

Figure 5:
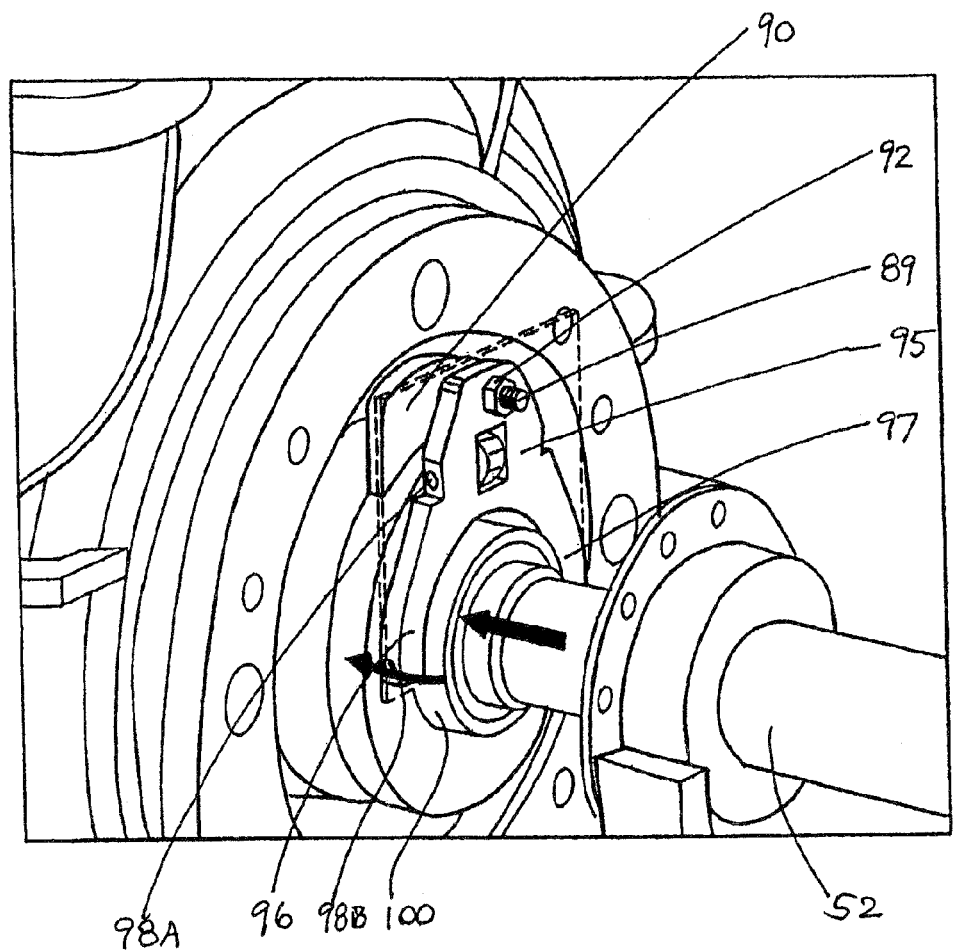
FIG. 5 is a perspective view of part of the adjustment mechanism shown in FIG. 4.
Figure 6:
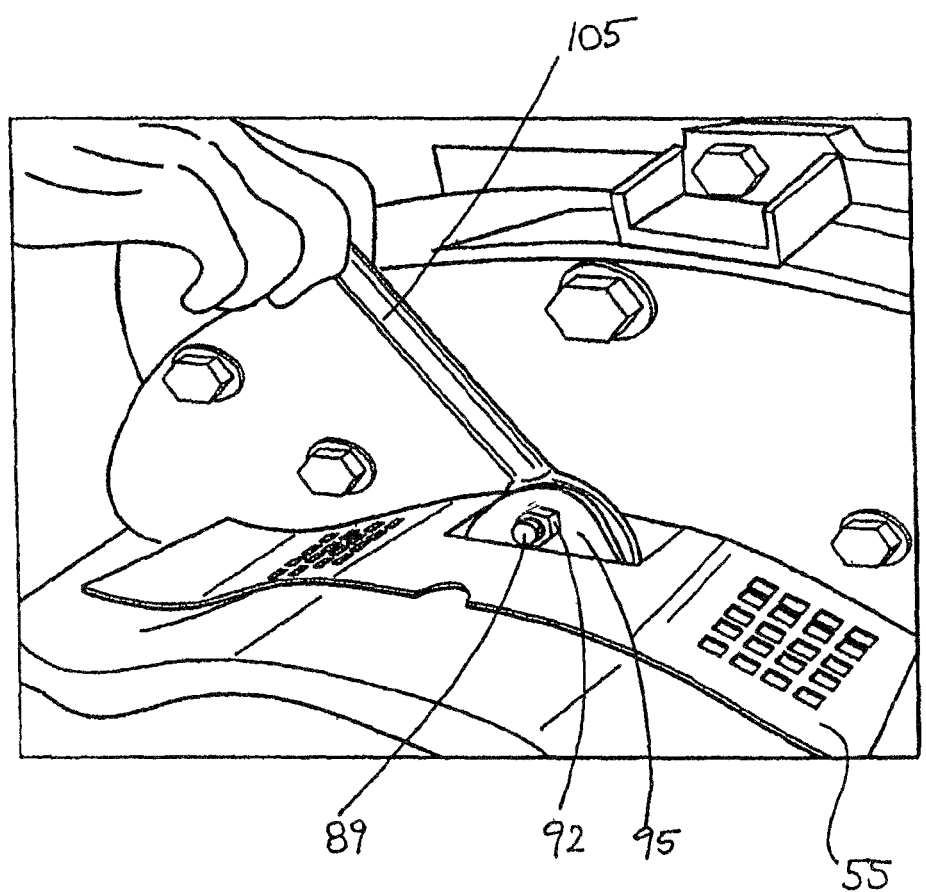
FIG. 6 is a perspective view illustrating how adjustment of the adjustment mechanism that is shown in FIGS. 4 and 5 can be effected.

The seal assembly 80 is best understood with reference to FIGS. 4 to 6. The seal assembly 80 comprises a rotating seal in the form of a circumferential ring 81 which is operatively mounted for rotation with the drive shaft 52. A shaft sleeve or gland sleeve 82 overlies the drive shaft 52 and is arranged to rotate therewith. The rotatable ring seal 81 is mounted on one end of the gland sleeve 82. The rotatable ring seal 81 is in the form of a flexible ring and may be formed from an elastomer, such as rubber. The seal assembly 80 further includes a static ring seal 84 (that is, a non-rotatable portion of the seal assembly 80) which in use is disposed in a close-facing relationship adjacent to the rotatable ring seal 81. The static ring seal 84 is in the form of a ring made from a hard material such as silicon carbide, which provides for a hard wearing face which can abut against the rotatable ring seal 81. The static ring seal 84 is mounted to an adjustment sleeve 87 which forms part of an adjustment mechanism 85 which is described in detail hereinafter. The adjustment sleeve 87 is slidably mounted for axial movement so that the static ring seal 84 can be moved towards or away from the rotatable ring seal 81. The adjustment sleeve 87 is mounted coaxially around the shaft or gland sleeve 82. A gland seal 78 is positioned between the seal housing 90 and the adjustment sleeve to provide a packing to prevent the leakage of any process fluid from the pump chamber 49 in use.

The adjustment mechanism 85 comprises an actuator 88 in the form of a stud 89 threadedly mounted into the seal housing 90. Two nuts 91 and 92 are threadedly received on the stud 89 for movement relative thereto, and each nut is located on an opposing side of a forked member 95 which is also positioned with the stud 89 extending therethrough. These nuts 91, 92 function to lock the forked member 95 in a particular position in relation to the stud 89. A transmission arrangement 93 is best seen in FIG. 5, incorporating these components. The forked member 95, which is in the form of a body arranged with two spaced-apart legs 96, 97 extending therefrom, is operatively connected between the actuator 88 and the adjustment sleeve 87. The forked member 95 is pivotally mounted at a pivot 98A and has one end secured to the stud 89 which extends therethrough and between the nuts 91 and 92. The ends of each leg 96 and 97 are pivotally mounted at a pivot 98B to a mounting ring 100, which is itself secured to (or in some embodiments formed as part of) the adjustment sleeve 87.

When assembled and when in use, the actuator 88 is disposed outside of a guard or cover screen or mesh 55 (FIG. 3). As is apparent from FIG. 3, the actuator enables a one-point adjustment operation which is well away from any of the moving parts of the pump. As shown in FIG. 6, an adjustment of the actuator 88 can be made by using a mechanical tool 105 which is shown in the form of a spanner to adjust the stud 89 and the nuts 91, 92, where the adjustment can be made from a "safe" position outside of the guard or cover 55.

Optimum operation of the seal assembly 80 requires that the adjusting sleeve 87, along with the wear face of the static ring seal 84, be tensioned against the face of rotatable ring seal 81 evenly in both the axial X-X direction (parallel to the shaft or gland sleeve 82) and in a plane perpendicular to the drive shaft 52. The contact surface between the rotatable ring seal member 81 and the static ring seal 84 is cooled and lubricated by a small leakage of process fluid. In normal operation, the seal assembly 80 must be set up to operate with, and maintain only, a small leakage. Failure to do so will result in the sealing surfaces overheating and damage occurring to the seal components. The small amount of leaking fluid which passes between the rotatable face seal 81 and the static wearing face seal 84 in use then passes along the annular gap between the shaft or gland sleeve 82 and the adjustment sleeve 87 before being expelled from the rear of the pump housing 30.

The operational adjustment requirement required for the forked member 95 and the adjustment sleeve 87 which is attached to it, is normally very small, at around a maximum of 2-3 mm axially in order to reduce/increase leakage and to take up any wear in the components of the seal assembly 80 over a period of time. The adjustment sleeve 87 is moved generally inwardly toward the pump housing 30 as shown by the arrows in FIG. 4, and a constant gland sealing is maintained between (i) the adjustment sleeve 87 and the gland seal 78 (which extends from the seal housing 90), and (ii) between the adjustment sleeve 87/static ring seal 84 and the gland sleeve 82/rotatable ring seal 81.

Due to internal wear there is also a requirement over a period of use for axial adjustment of the impeller 60 within the pump casing 30 in a direction toward the front liner (throatbush) 48, so that in fact the full movement required for the gland adjustment sleeve 87 may be up to 10 mm. Thus, for operation of the seal assembly 80 via the adjustment mechanism 85, there can be a coarse adjustment for set up, followed by a self-aligning single-point fine (or "operational") adjustment. To effect a coarse operational adjustment the position of the stud 89 and the nuts 91, 92 can initially locate the forked member 95 in a particular position. Fine adjustment later during operation can then be effected by rotation of the stud 89, or release of the nuts 91, 92 and repositioning of the forked member 95 and retightening of the nuts 91, 92 so as to touch the forked member 95. The forked member 95 acts on the adjustment sleeve 87 with two points of contact 98B on its centreline X-X to provide the axial tension, and the adjustment sleeve 87 is centralized as it passes through the close tolerance of the gland cover. As described earlier, the adjustment sleeve 87 has a (or is fitted with a separate) circumferential mounting ring 100 which allows the adjustment sleeve 87 and associated static ring seal 84 to be slid forwards in the direction of the arrows shown in FIG. 4, and brought into contact with the rotatable ring seal 81 (coarse adjustment). The mounting ring 100 can then be locked off, and the movement of the fork member 95 can then be used for fine/operational adjustment.

The pivotal mounting arrangement of the forked member 95 at the pivot points 98A and 98B is especially useful for allowing the "fine tuning" operational adjustment to occur during use of the pump to which the seal assembly 80 is fitted. The pivot points 98A, 98B are each arranged in a line transverse to the axis of the adjustment sleeve 87, and thus can provide a centering effect for any axial movement of that sleeve 87, which is important so that the seal faces 81, 84 are aligned parallel. This in turn provides better control of the small leakage of process fluid therebetween during use of the pump. The use of pivots (such as rotatable rods, pins or studs) allows virtually friction-free tilting movement of the forked member 95 to cause the said axial movement of the sleeve 87. The use of a forked member 95 means that the axial movement of the mounting ring 100/adjustment sleeve 87 is evenly controlled from opposing sides thereof. The forked member 95 functions like a saddle to provide an even spread of displacement force on either side of the sleeve 87.

Referring now in particular to FIGS. 7 to 10 there is shown a discharge apparatus 108 for use with a pump housing 30. The discharge apparatus 108 includes an adaptor 70 which comprises a rigid main body 112 (normally made in one piece and of metal) with a discharge passageway or port 111 therein extending from a first end 113 to a second end 114. The first end 113 is arranged to align with the discharge outlet 56 portion of the pump housing 30. A mounting flange 120 is provided at the first end 113 which is adapted to be fitted to a cooperating flange 125, 126 which is located on the pump outer casing side parts 33, 34 respectively. The second end 114 is adapted to be mounted to adjacent pipework 200 by means of a flange component 116. The flange component 116 may comprise two parts 117, 118 which are mirror images of one another and are secured together by bolts 119. The flange component 116 is separate from the adaptor main body 112 and is arranged to secure an inner liner 138 in position as described hereinafter. The discharge passageway or port 111 may be frusto conical in shape, as is the external side wall 115 of the main body 112.

Figure 7:
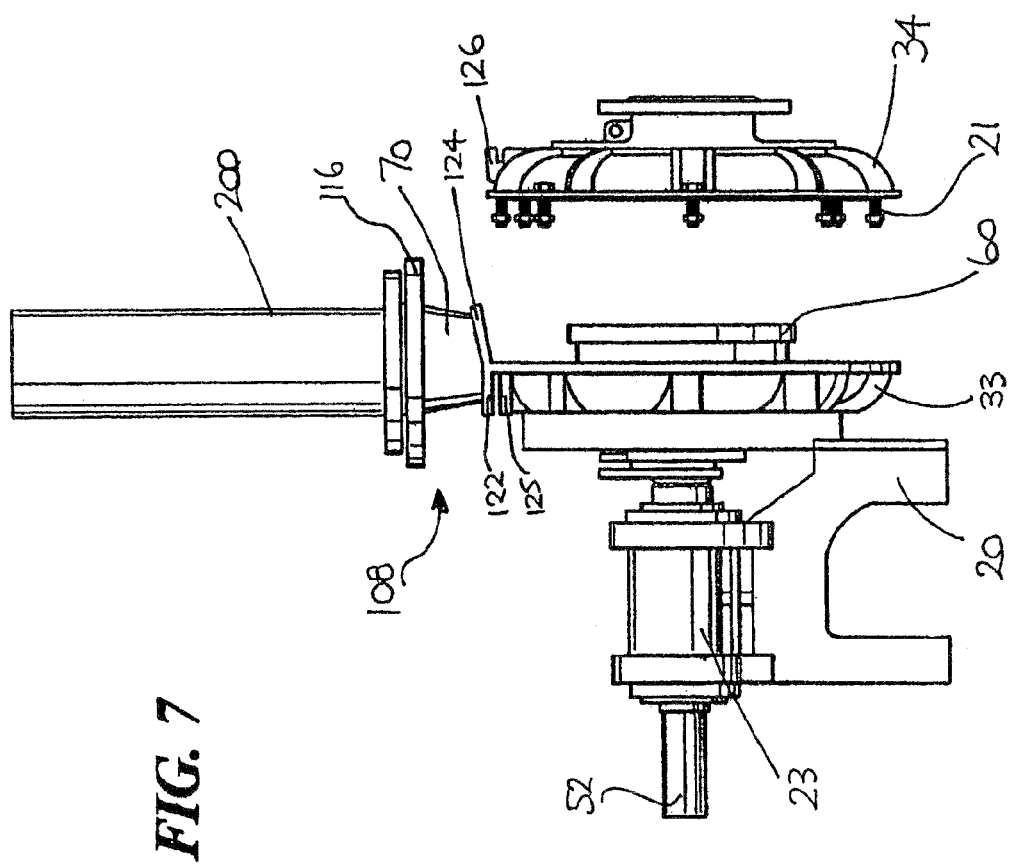
FIG. 7 is a side elevation of the pump apparatus shown in FIGS. 1 to 6 illustrating an adaptor.
Figure 8:
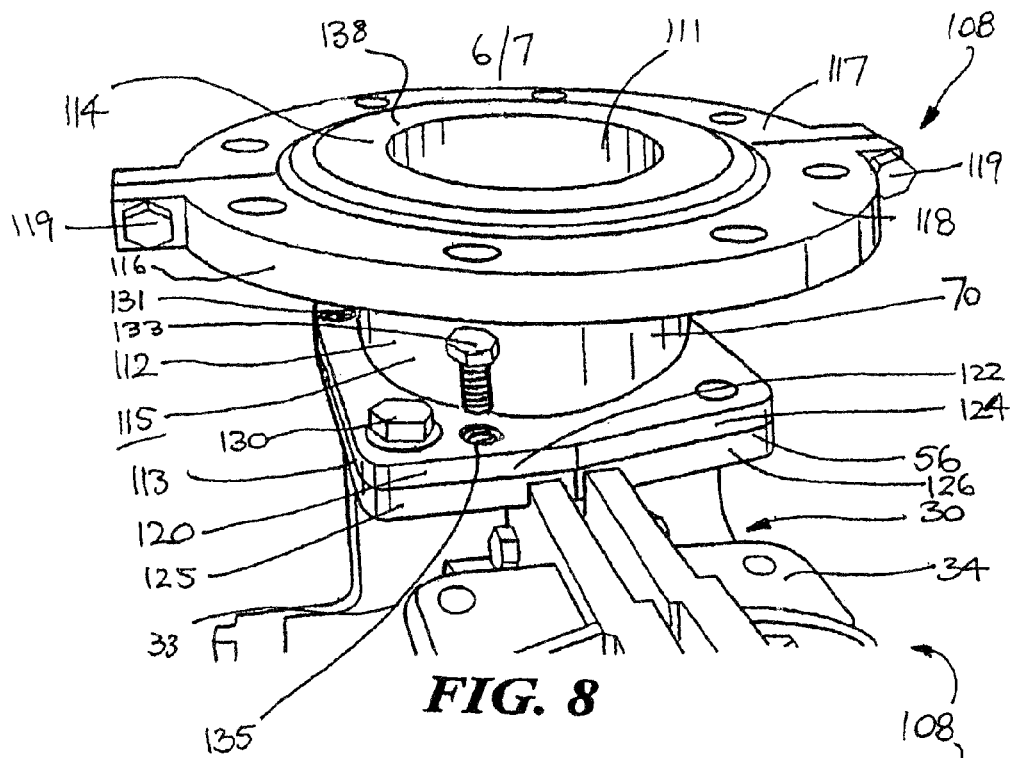
FIG. 8 is a detail perspective view of the adaptor shown in FIG. 7 in a first position in relation to the rest of the pump apparatus.
Figure 9:
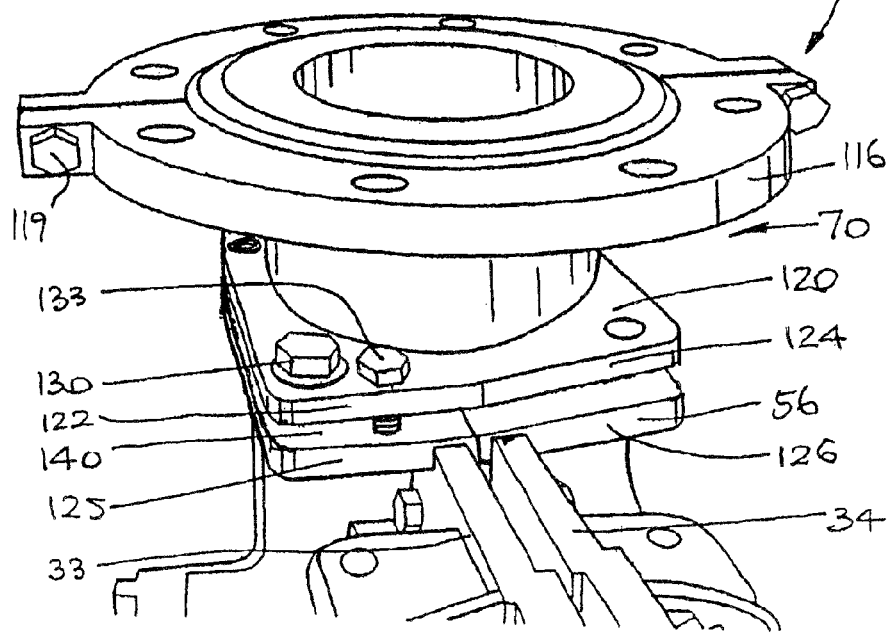
FIG. 9 is a sectional side elevation of the adaptor shown in FIG. 7 in a second position in relation to the rest of the pump apparatus.

As best seen in FIGS. 7, 8 and 9, the flange 120 includes a first section 122 which is generally at right angles to the axis of the pump discharge passageway 111 and which is adapted to be bolted to the flange 125 on the side part 33 (frame plate). The flange 120 also includes a second section 124 which is inclined with respect to the first section 122 and cooperates with a similarly inclined flange 126 on the pump casing side part (cover plate) 34. Some bolts 130 are used to secure the flanges 122/125 together and also to secure the flanges 124/126 together. There are four bolts 130, one located at each corner of the two flanges 122, 124. Only one bolt 130 is actually shown in the Figures. Another bolt 130 is received in a bolt hole 131 during use.

The discharge apparatus 108 further includes a displacement device 132 which is operable to cause displacement between the adaptor 70 and the pump discharge outlet portion 56. The device 132 comprises a series of threaded bolts 133 which are received within respective threaded apertures 135, and which when rotated, act on the discharge outlet portion 56 to displace the adaptor 70 therefrom. The threaded apertures 135 are formed in the first section 122 of the flange 120. When the bolts 133 are in the threaded apertures 135, rotation of the bolts 133 will cause the free end of the threaded shank of the said bolts 133 to react against the uppermost face of the discharge outlet flange 125 to thereby force the discharge outlet portion 56 and the adaptor 70 apart. FIG. 8 illustrates the adaptor 70 firmly bolted to the discharge outlet portion 56. FIG. 9 illustrates the two parts 56, 70 displaced apart from one another. As shown in FIG. 9, there is a gap 140 located between the two parts. In the displaced position, the casing side part 34 can be readily removed.

In some further embodiments, the displacement device 132 may not be necessary. The inclination of the second flange section 124 and the flange 126 which is formed on casing side part 34 can enable the side part (front cover plate) 34 to be removed from the front region of the pump casing 30. In both cases the side part (front cover plate) 34 can be removed without requiring the pipework 200 to be disassembled from the casing side part (frame plate) 33. In the embodiment shown the inclination of the second flange is of the order of ten (10) angle degrees, although angles of as little as five (5) or as much as 40 angle degrees are acceptable from the point of view of being able to slidably release and remove the front cover plate 34.

The drawings show a displacement device where the bolts 133 cooperate with threaded apertures in the first section 122 of the flange 120. In another embodiment, the bolts 133 could be arranged to cooperate with threaded apertures which are located in the flange 125 on the pump casing side part (frame plate) 33, so as to act to cause relative movement between the first section 122 of flange 120 by moving it upwardly and away from the flange 125.

Figure 10:
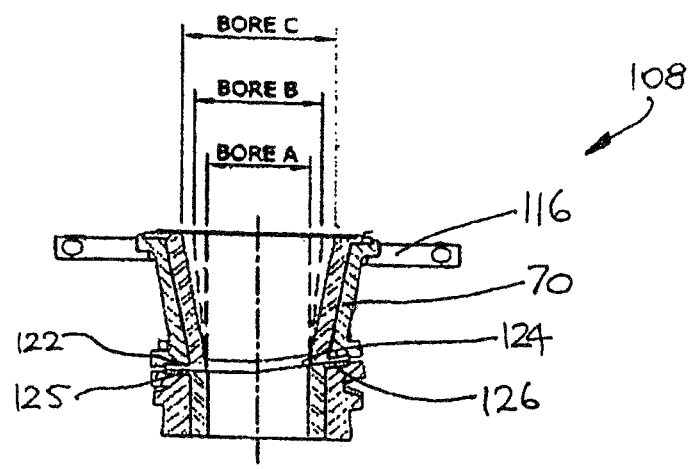
FIG. 10 is a sectional side elevation of the adaptor shown in FIGS. 7 to 9.

As mentioned earlier the adaptor 70 further includes a replaceable liner 138 which is receivable within the discharge passageway 111. The liner 138 is held captive or clamped within the discharge passageway 111 by means of the flange component 116. The adaptor 70 is arranged so as to be able to receive different liners of many different internal bore configurations, as shown in FIG. 10.

When fully installed, the adaptor 70 is disposed between the pump discharge outlet portion 56 and the adjacent pipework 200. The flange section 122 is bolted to the flange 125 of the discharge outlet 56 on side casing part (frame plate) 33 by means of bolts 130. The lowermost in use flange section 124 of the adaptor 70 is bolted to the flange 126 of the discharge outlet 56 at the front side casing part (cover plate) 34. The activation of bolts 133 on the flange section 122 of the adaptor 70 causes upwards displacement of the adaptor 70 relative to the pump discharge outlet portion 56. When displaced, there is a gap 140 between the components which facilitates ready removal of only the side casing part (front cover plate) 34, as shown in FIG. 7. Access and removal of the side casing part (front cover plate) 34 is improved by having the inclined flange section 124 because the combination of these features means that the upward displacement of adaptor 70 relative to the pump discharge outlet portion 56 need not be a very great distance before the side casing part (front cover plate) 34 becomes releasable and removable. A small amount of such vertical separation is desirable to break any seal which might have formed by a joint gasket which has deteriorated, or to fracture any particulate deposits or scaling which may have built up inside the pump and between the various components.

The arrangements that have been described above enable the replacement of some pump components without the need for removal of the adjacent pipework, and this allows rapid dismantling and removal of all wearing components from the pump. This gives a clear benefit in terms of down time improvement for the end user. A further feature is that the apparatus provides for the fitment of loose liners in combination with alternative port sizes, to provide a smooth transition of flow from the pump to the associated pipework, as shown in FIG. 10.

The discharge adaptor 70 is a rigid cast component which forms part of the pump casing and allows all wearing and service components to be removed from the pump whilst the discharge pipe is still connected thereto. Built-in jacking screws allow the pipework to be loosened and "jacked" to create a gap sufficient to allow for the removal of the remaining wear component and the rear casing liner.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "above" and "below" and the like are used as words of convenience to provide reference points and are not to be construed as limiting terms.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

Finally, it is to be understood that various alterations, modifications and/or additions may be incorporated into the various constructions and arrangements of parts without departing from the spirit or ambit of the invention.

The invention claimed is:

1. An adjustment mechanism for a seal assembly for a pump drive shaft of a pump, the pump shaft mounted for rotation about a rotation axis, the adjustment mechanism comprising:
    an adjustment member which is axially moveable so as to cause axial movement of a portion of a seal assembly of a pump;
    an actuator which is operable at a single point; and
    a transmission for transmitting a motive force from the actuator to the adjustment member as a result of activation of the actuator, the transmission being operatively connected to the adjustment member at two or more spaced apart couplings disposed on opposing sides of the adjustment member, whereby activation of the actuator causes simultaneous transmission of the motive force to the couplings.

2. The adjustment mechanism according to claim 1, wherein the transmission comprises a fork shaped member having two spaced apart legs extending away from one end of the fork shaped member, the free end of each of the legs being pivotally connected to a respective one of the two spaced apart couplings, the fork shaped member being mounted for pivotal movement in a region between the one end of the fork shaped member and the free ends of the spaced apart legs, the one end of the fork shaped member being associated with the actuator.

3. The adjustment mechanism according to claim 2, wherein, when fitted, the actuator is spaced from the drive shaft and external of all pump parts.

4. The adjustment mechanism according to claim 3, wherein said actuator comprises a stud mounted to the pump and one or more bolts threadably received on the stud, the arrangement being such that rotation of the or each bolt causes the transmission to deflect the transmission of the motive force.

5. The adjustment mechanism according to claim 2, wherein said actuator comprises a stud mounted to the pump and one or more bolts threadably received on the stud, the arrangement being such that rotation of the or each bolt causes the transmission to deflect the transmission of the motive force.

6. The adjustment mechanism according to claim 1, wherein, when fitted, the actuator is spaced from the drive shaft and external of all pump parts.

7. The adjustment mechanism according to claim 6, wherein said actuator comprises a stud mounted to the pump and one or more bolts threadably received on the stud, the arrangement being such that rotation of the or each bolt causes the transmission to deflect the transmission of the motive force.

8. The adjustment mechanism according to claim 1, wherein said actuator comprises a stud mounted to the pump and one or more bolts threadably received on the stud, the arrangement being such that rotation of the or each bolt causes the transmission to deflect the transmission of the motive force.

9. An adjustment mechanism for a seal assembly for a pump drive shaft of a pump, the pump shaft being mounted for rotation about a rotation axis and having an access zone located near the drive shaft and pump, an adjustment member which is axially moveable so as to cause axial movement of a portion of the seal assembly, the adjustment member including an adjustment sleeve, which is mounted substantially coaxially with respect to the drive shaft in an assembled position and axially moveable relative thereto, the portion of the seal assembly being operatively mounted to or adjoined to one end of the adjustment sleeve, an actuator positioned outside the access zone of the pump and a transmission for transmitting a motive force from the actuator to the adjustment member as a result of activation of the actuator, the transmission being operatively connected to the adjustment member at two or more spaced apart couplings, the adjustment mechanism further including a mounting member secured to the other end of the adjustment sleeve, the spaced apart couplings being on the mounting member, whereby activation of the actuator causes simultaneous transmission of the motive force to the couplings.

10. The adjustment mechanism according to claim 9, wherein the actuator is operable from a single point.

11. The adjustment mechanism according to claim 10, wherein, when fitted, the actuator is spaced from the drive shaft and external of all pump parts.

12. The adjustment mechanism according to claim 10, wherein said actuator comprises a stud mounted to the pump and one or more bolts threadably received on the stud, the arrangement being such that rotation of the or each bolt causes the transmission to deflect the transmission of the motive force.

13. The adjustment mechanism according to claim 9, wherein the mounting member comprises a ring secured to the other end of the adjustment sleeve.

14. The adjustment mechanism according to claim 13, wherein the spaced apart couplings are pivot mountings disposed at opposite sides of the adjustment sleeve.

15. The adjustment mechanism according to claim 14, wherein, when fitted, the actuator is spaced from the drive shaft and external of all pump parts.

16. The adjustment mechanism according to claim 14, wherein said actuator comprises a stud mounted to the pump and one or more bolts threadably received on the stud, the arrangement being such that rotation of the or each bolt causes the transmission to deflect the transmission of the motive force.

17. The adjustment mechanism according to claim 13, wherein, when fitted, the actuator is spaced from the drive shaft and external of all pump parts.

18. The adjustment mechanism according to claim 13, wherein said actuator comprises a stud mounted to the pump and one or more bolts threadably received on the stud, the arrangement being such that rotation of the or each bolt causes the transmission to deflect the transmission of the motive force.

19. The adjustment mechanism according to claim 9, wherein the transmission comprises a fork shaped member having two spaced apart legs extending away from one end of the fork shaped member, the free end of each of the legs being pivotally connected to a respective one of the two spaced apart couplings, the fork shaped member being mounted for pivotal movement in a region between the one end of the fork shaped member and the free ends of the spaced apart legs, the one end of the fork shaped member being associated with the actuator.

20. The adjustment mechanism according to claim 19, wherein, when fitted, the actuator is spaced from the drive shaft and external of all pump parts.

21. The adjustment mechanism according to claim 19, wherein said actuator comprises a stud mounted to the pump and one or more bolts threadably received on the stud, the arrangement being such that rotation of the or each bolt causes the transmission to deflect the transmission of the motive force.

22. The adjustment mechanism according to claim 9, wherein, when fitted, the actuator is spaced from the drive shaft and external of all pump parts.

23. The adjustment mechanism according to claim 22, wherein said actuator comprises a stud mounted to the pump and one or more bolts threadably received on the stud, the arrangement being such that rotation of the or each bolt causes the transmission to deflect the transmission of the motive force.

24. The adjustment mechanism according to claim 9, wherein said actuator comprises a stud mounted to the pump and one or more bolts threadably received on the stud, the arrangement being such that rotation of the or each bolt causes the transmission to deflect the transmission of the motive force.

25. An adjustment mechanism for a seal assembly for a pump drive shaft of a pump, the pump shaft being mounted for rotation about a rotation axis, with an access zone located for providing access to the seal assembly, and a guard at least partially surround the access zone, the adjustment mechanism comprising:
an adjustment member which is axially moveable so as to cause axial movement of a portion of a seal assembly of a pump;
an actuator that is operable at a single point; and
a transmission for transmitting a motive force from the actuator to the adjustment member as a result of activation of the actuator, the transmission being operatively connected to the adjustment member, whereby activation of the actuator causes simultaneous transmission of the motive force to the adjustment member, the actuator being spaced from the drive shaft and external of the guard when fitted.

* * * * *